March 19, 1968  D. J. HARDY ET AL  3,373,839
GROUND EFFECT VEHICLES WITH EXTENSIBLE BASE AREA
Filed July 12, 1965  7 Sheets-Sheet 1

March 19, 1968 D. J. HARDY ET AL 3,373,839
GROUND EFFECT VEHICLES WITH EXTENSIBLE BASE AREA
Filed July 12, 1965 7 Sheets-Sheet 3

United States Patent Office 3,373,839
Patented Mar. 19, 1968

3,373,839
GROUND EFFECT VEHICLES WITH
EXTENSIBLE BASE AREA
Derek James Hardy, Cowes, and Lavis Albert Henry
Riddle, East Cowes, Isle of Wight, England, assignors to Westland Aircraft Limited, Yeovil,
England
Filed July 12, 1965, Ser. No. 471,336
Claims priority, application Great Britain, July 28, 1964,
30,039/64
12 Claims. (Cl. 180—128)

ABSTRACT OF THE DISCLOSURE

An air cushioned vehicle which utilizes an inflatable flexible skirt for selectively forming a supporting air cushion for the main body of the vehicle of greater lateral area than that of the main body portion. The inflatable flexible skirt is attached to the vehicle by, for example, flexible inflatable supporting members which are separated from the skirt in an air tight manner thereby permitting the supporting members to be maintained at pressures different from that maintained in the skirt.

This invention relates to air cushion vehicles or ground effect machines of the type which are supported above the surface by a cushion of pressurized air or other fluid which is created and maintained between the bottom area of the vehicle and the surface over which the vehicle is operating. More particularly the invention relates to improved arrangements for forming variable boundaries for the plan area of the vehicle.

Vehicles of the type to which the instant invention relates are well known in the art, and specifically such vehicles are well known which provide below the structure of the vehicle various types of barriers to the escape of air from the cushion or cushions upon which the vehicle is supported. The most successful and advantageous type of barrier developed to date involves the use of a flexible skirting assembly which depends from the rigid base structure of the vehicle to retain the cushion pressure while simultaneously raising the effective operating height of the rigid base structure of the vehicle, the flexible skirting serving to give way and pass over encountered obstacles.

It is generally desirable, and in some roles it is practically necessary, to reduce the plan area of the air cushion vehicle when it is not in use. Thus particularly for those vehicles which will be transported in other types of vehicles such as trucks, ships or aircraft, it is imperative that the air cushion vehicle occupy the minimum space while it is being transported. One of the proposed roles for air cushion vehicles in which this feature will be important involves the operation of an air cushion vehicle from a parent vessel as a rescue vehicle or as a lifeboat. Toward minimizing the space required for transport of air cushion vehicles on other types of vehicles, it has been proposed, among other things, to design and build air cushion vehicles which can be broken down into units which are of a size suitable for transporting on other types of vehicle. It is a general object of the instant invention to acheive these same capabilities and characteristics in an air cushion vehicle which does not have to be broken down into components of a size suitable for such transporting. It will be understood, however, that the instant invention is not restricted to air cushion vehicles which are of a size as to be transportable, but the invention advantageously can be applied equally to vehicles of any size.

Accordingly, it is an object of this invention to provide an air cushion vehicle having a rigid base structure which is effectively the load carrying part of the vehicle and which determines the overall dimensions of the vehicle when it is not in operation, the vehicle having means for selectively forming a supporting air cushion of greater lateral area than the lateral area of the rigid base structure and for selectively retracting inwardly toward the rigid base structure so as to reduce the horizontal dimensions of the vehicle when not in operation.

It is a further object of this invention to provide such a vehicle wherein the air cushion during operation is defined by a flexible skirt extending at least partially around and downwardly relative to the rigid base structure, the vehicle being provided with flexible inflatable means connected to the rigid base structure and to the flexible skirt for selectively supporting the skirt outwardly of the rigid base structure when inflated and for selectively collapsing inwardly when deflated.

It is a further object of this invention to provide such a vehicle wherein the supporting air cushion during operation is defined at least in part by a flexible skirt connected to the rigid base structure and extending outwardly and downwardly therefrom, the vehicle being provided with suitable tie members extending between points on the rigid base structure and points on the flexible skirt for supporting the skirt in its outwardly and downwardly extending position.

It is still a further object of this invention to provide such a vehicle wherein the supporting air cushion during operation is defined by a flexible skirt of double wall construction having inner and outer walls connected to the rigid base structure and extending outwardly and downwardly therefrom, the flexible skirt having a nozzle opening extending along the lower edge thereof through which pressurized gas is discharged to create and maintain the supporting air cushion. The nozzle opening in such a vehicle extends at least in part outwardly of the rigid base structure during operation thus extending at least some of the dimensions of the supporting air cushion beyond the corresponding dimensions of the rigid base structure.

It is still a further object of this invention to provide such a vehicle wherein appropriate tie members or supports are provided to maintain the skirting member in its position outwardly of the rigid base structure during operation of the vehicle.

Other and further objects, advantages and features of the invention will be apparent to those skilled in the art from the ensuing description and illustration of a number of embodiments of the invention.

The novel features that we consider characteristic of our invention are set forth with particularity in the appended claims. The invention itself, however, both as to its organization and its operation, together with additional objects and advantages thereof will best be understood from the following description when considered in connection with the accompanying drawings wherein:

Figure 1:
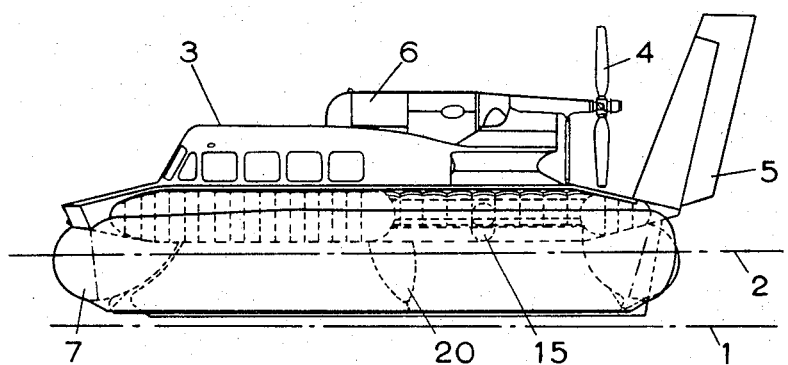
FIGURES 1 and 2 are respectively elevation and plan views of a vehicle according to one form of the invention.
Figure 2:
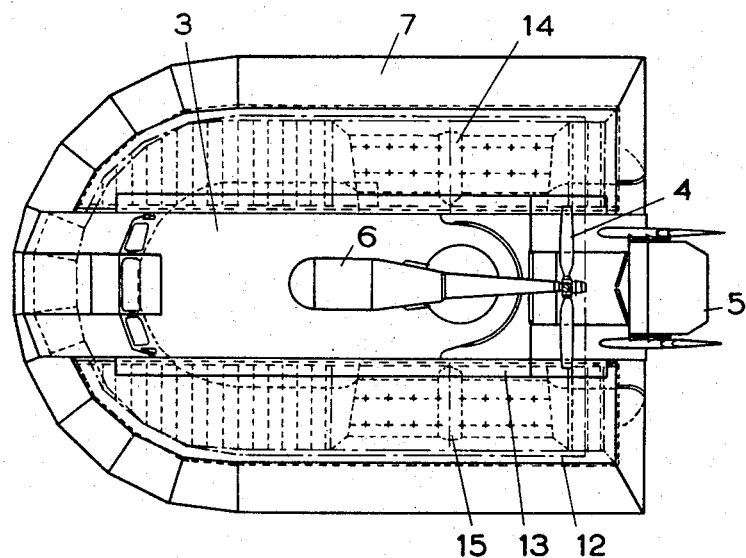

Referring to the drawings, particularly FIGURES 1–4, the general form of a typical vehicle is shown in FIGURE 1 where it is shown cushionborne in relation to a ground line schematically indicated at 1, the static or inoperative ground line being shown schematically at 2. The rigid base structure of the vehicle carries a cabin 3, a propeller 4 which provides propulsion for the vehicle, an empennage 5, and an engine 6. A flexible hollow skirt 7 is supported by a structure comprising two different types of flexible pressurized members. The skirt at the forward half of each side of the vehicle and around the bow of the vehicle is supported by a single member 8, shown in cross-section on the left-hand side of FIGURE 3. This member comprises a simple hollow flexible structure of approximately conical cross-section. The base 9 of inflated member 8 is attached to the rigid part of the vehicle, and the apex 10 extends horizontally outwardly. The skirt 7 is extended by inflating the member 8 to a pressure sufficient to provide the necessary rigidity, the pressure being provided by any convenient means, for instance, an independent compressor driven by the main engine 6. Preferably the pressure source for inflatable member 8 should be different from the cushion generating pressure source. The skirt and cushion pressures of course are supplied by a main lift fan in a manner well known in the art. Preferably but not necessarily, the member 8 is formed with internal flexible diaphragms to cooperate with the air pressure in providing the necessary stiffness or rigidity during operation. A walkway 11 surrounds the cabin 3.

Figure 3:
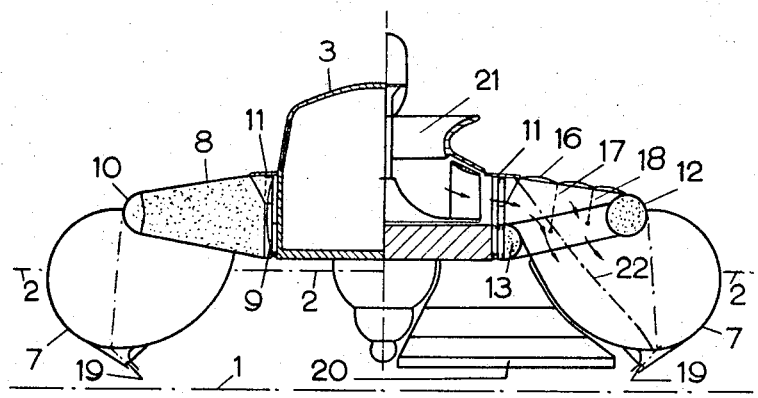
FIGURE 3 is a transverse sectional view illustrating the skirt extending means of the vehicle shown in FIGURES 1 and 2, the two sides of FIGURE 3 being sectional views taken at different section lines along the longitudinal axis of the vehicle.

The aft part of the side skirt is supported by a flexible structure of a different type as shown in cross-section on the right-hand side of FIGURE 3. This structure consists of an outer circumferential inflatable tube 12 and an inner semi-circumferential tube 13, the inner tube 13 being attached to the rigid part of the vehicle. These two tubes are connected by radial tubes such as 14 and 15, all the tubes being inflated by the same compressor as is used for inflating the member 8. The inner and outer tubes 13 and 12 provide respectively supports for the inner and outer walls of the flexible peripheral skirt 7 as illustrated in the right-hand portion of FIGURE 3. Above the pressurized flexible tube a substantially horizontal diaphragm 16 supported by tie members such as 17 and 18 provides a duct from the air supply in the rigid structure to flexible peripheral jet nozzles 19 to create and maintain the pressurized supporting cushion under the rigid base structure and the flexible extended assemblies. Passages inboard of the inner circumferential tube conduct air to the stability skirts, one of which is shown at 20. The air for the fan of course enters the system at 21.

Provision is made for lifting the skirit system for either control of the vehicle, reduction of water drag when the air cushion vehicle is operating as a displacement vehicle, or reduction of skirt crumpling when the vehicle settles down when the engine is stopped. The skirt is lifted, for instance, by means of cables indicated schematically at 22.

Figure 4:
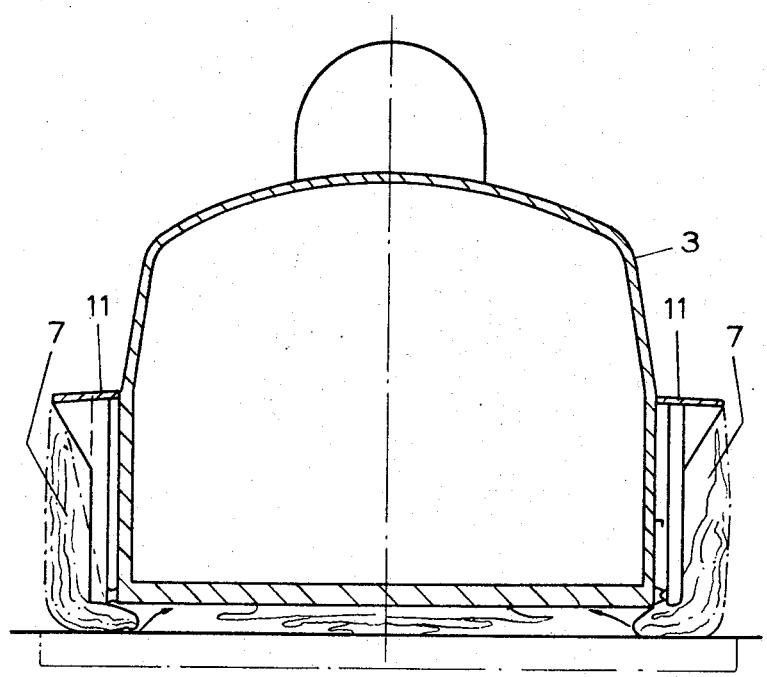
FIGURE 4 is a cross-section of a vehicle such as the vehicle shown in FIGURES 1–3 showing the skirt and the skirt extending means in a collapsed or retracted condition.

The operation of the vehicle shown in FIGURES 1–4 will be readily apparent to those skilled in the art. The inflatable skirt supporting members 8 and 12–15 are pressurized to increase the cushion area of the vehicle, and pressurized cushion air is supplied from the main fan to the nozzles 19 to create the air cushion under the vehicle and raise the vehicle clear of the surface. When it is desired to reduce the air cushion vehicle to its minimum size when in the static condition, the pressure is released in the pressurized members 8 and 12–15, thus causing these members to collapse inwardly and reducing the dimensions of the vehicle substantially as illustrated in FIGURE 4. Suitable valving arrangements for these pressurized or inflatable members are well known to those skilled in the art, and accordingly the valves have not been illustrated in the drawings.

Figure 5:
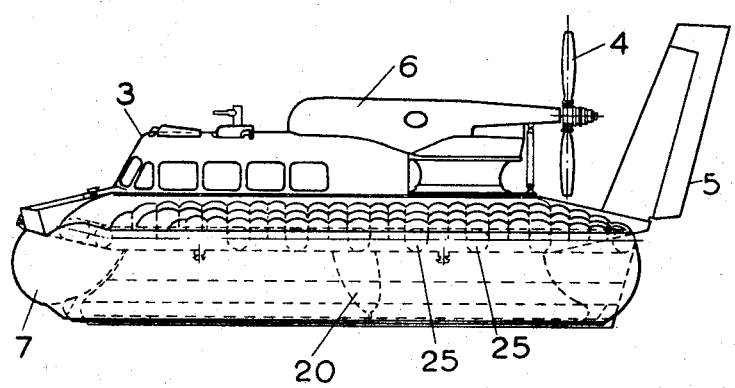
FIGURES 5 and 6 are respectively elevation and plan views of a vehicle according to another form of the invention.
Figure 6:
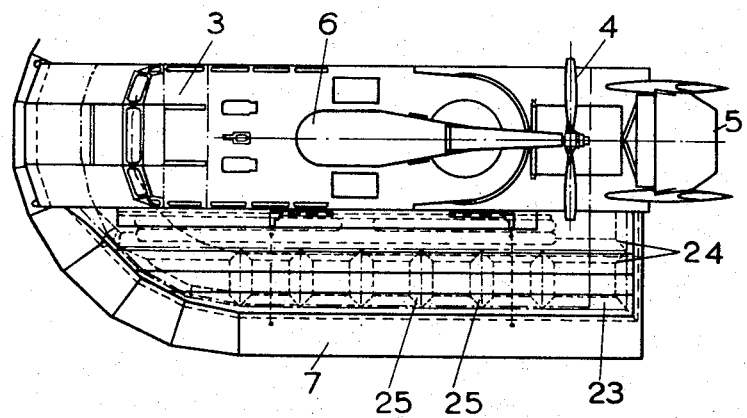
Figure 7:
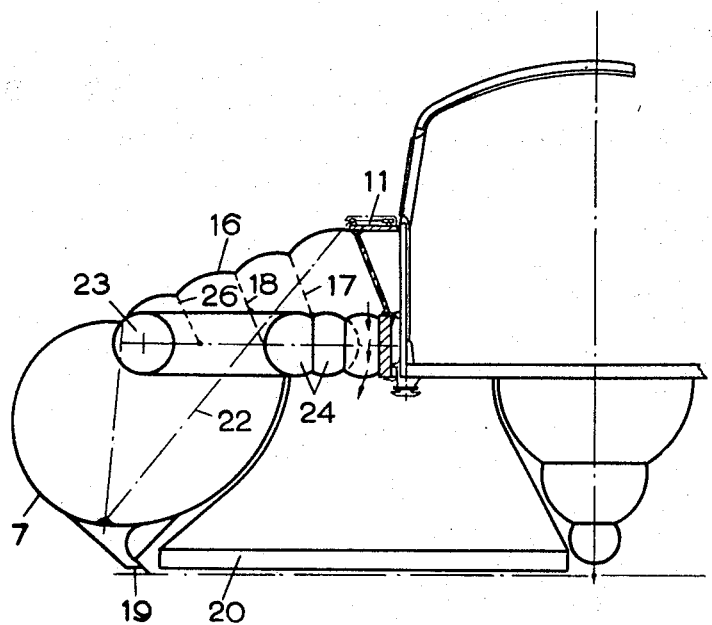
FIGURE 7 is a diagrammatic partial sectional view illustrating the skirt extending means for the vehicle shown in FIGURES 5 and 6.

FIGURES 5–7 show a slightly different form of vehicle, corresponding reference numerals being used where applicable. In the vehicle of FIGURES 5–7 outer and inner circumferential tubes 23 and 24 support the entire skirt, extending around the bow and stern of the vehicle and along the full length of both sides. The circumferential tubes are connected by a series of radial tubes such as 25, spaced along the sides of the vehicle. The inner tube 24 is shown as being of multiple section, and the entire system is inflated to a pressure sufficient to give the required rigidity. A diaphragm 16 and tie cords 17 and 18 are fitted as in the embodiment of FIGURES 1–4, but an additional tie cord 26 is incorporated. The operation of the vehicle of this embodiment is identical to the operation of the embodiment of FIGURES 1–4.

Figure 8:
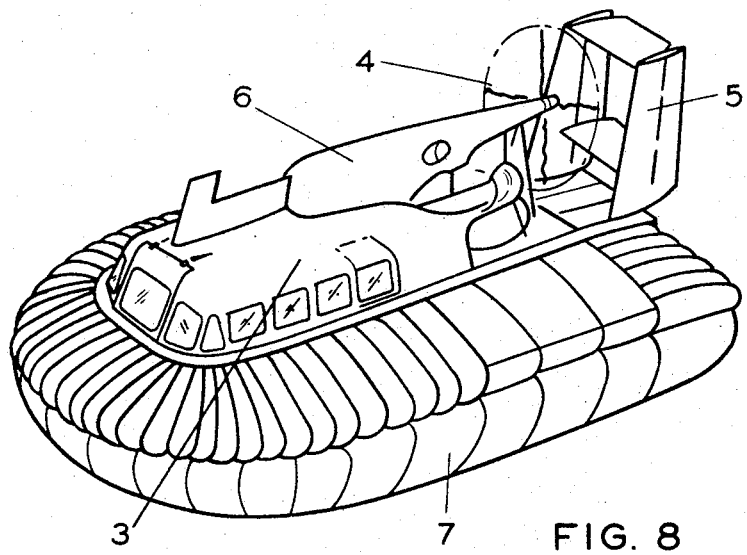
FIGURE 8 is a perspective view of an air cushion vehicle illustrating the skirt extending means supporting the skirt assembly around the whole of the perimeter of the rigid platform of the vehicle.

FIGURE 8 is a perspective illustration of an air cushion vehicle wherein the extendable structure comprises a plurality of inflatable components in side by side relationship and in substantially sealing engagement with each other, the components being generally V-shaped in vertical cross-section. The V-shaped components are attached to the rigid part of the vehicle at the widest part of the V, and have the outer wall of the flexible skirt assembly depending from the point of the V. The components are shaped so that substantailly sealing engagement is retained around the curved part of the perimeter of the vehicle. It will be noted that the vehicle of FIGURE 8 does not include the forwardly projecting rigid portion in front of the cabin as illustrated in FIGURE 3, but it will of course be understood that the vehicle of FIGURE 8 could include such a forwardly projecting rigid portion to facilitate access to the front entrance of the cabin. The presence or absence of this forward rigid projection does not have any substantial effect on the invention itself. Thus in the embodiment of FIGURE 1, for instance, the flexible inflated member 8 extends around the bow under this rigid bow extension which houses the entryway.

Figure 9:
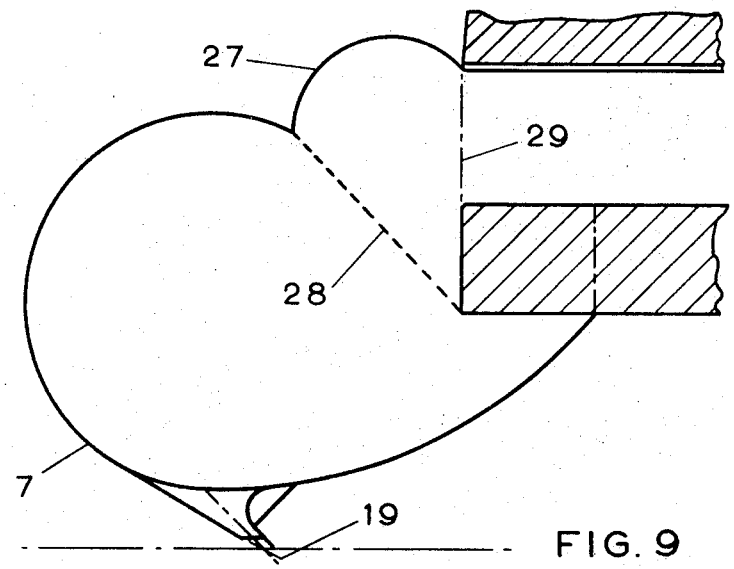
FIGURES 9–13 are diagrammatic sectional views showing five further forms of the invention for extending the skirt beyond the rigid base structure of the air cushion vehicle.

FIGURE 9 shows a somewhat different form of flexible skirt assembly for extending the dimensions of the supporting air cushion. The embodiment of FIGURE 9 is a tied-back arrangement in which a high pressure member is not required. The upper part of the outer wall of the skirt 7 is attached to the rigid part of the vehicle by an extension 27, and a degree of rigidity or stiffness is provided by ties such as 28 extending between the outer wall of the flexible skirt and the rigid base structure of the vehicle. Air at skirt pressure enters the flexible skirt through an inlet 29 which connects with the main fan of the vehicle, this pressurized air in turn issuing from nozzle openings 19 to create and maintain the supporting air cushion under the vehicle. The flexible skirt of FIGURE 9 automatically collapses inwardly toward the vehicle when the supply of pressurized air at inlet 29 is terminated.

Figure 10:
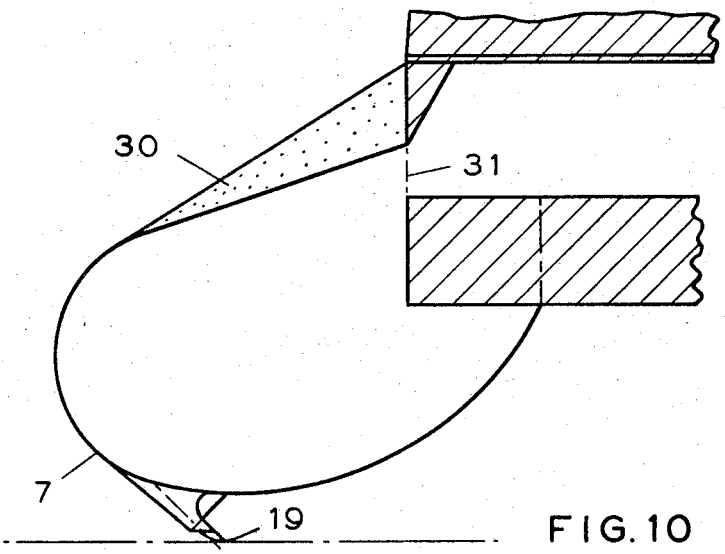

In the embodiment of FIGURE 10 the upper part of the outer wall of the flexible skirt 7 includes or is attached to a pressurized beam 30 which is connected to the rigid base structure of the vehicle. Pressurized air for the skirt enters through an inlet 31. The pressurized beam 30 will be pressurized in substantially the same manner as the inflated members of the embodiment of FIGURE 1, for instance.

Figure 11:
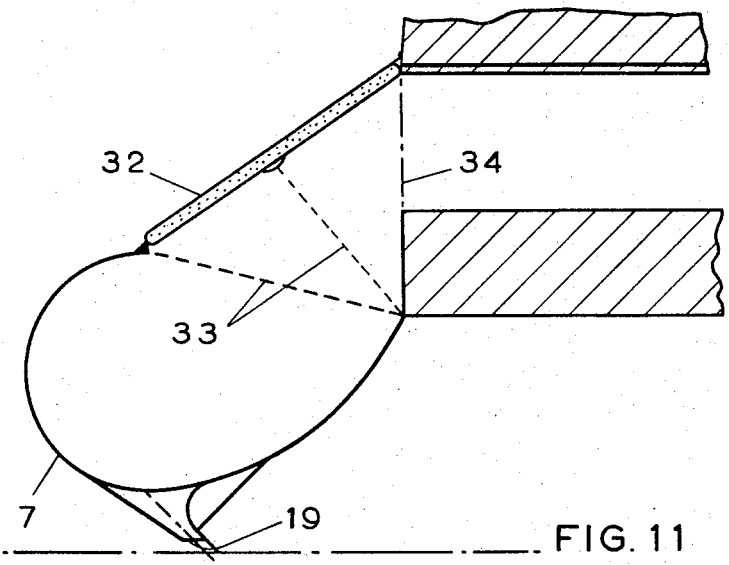

In the embodiment of FIGURE 11 the skirt is supported by a pressurized member 32 and ties 33 so as to maintain its outwardly and downwardly extending position when the vehicle is in operation, the skirt air entering at inlet 34.

Figure 12:
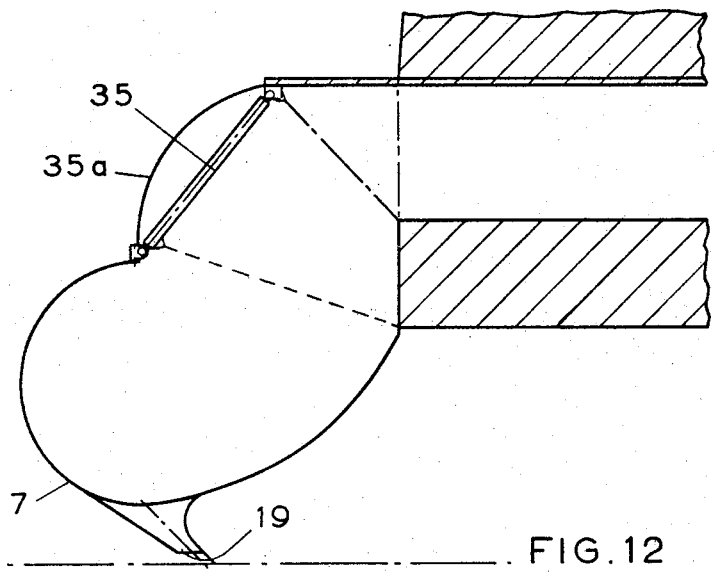

The embodiment of FIGURE 12 is similar to that shown in FIGURE 11, except that the pressurized member is replaced by rigid members 35 having ball joints at each end an a continuous diaphragm 35a extending thereover. When the supply of pressurized air to the skirt is terminated, the skirt will collapse inwardly and the rigid member 35 will pivot inwardly in a counterclockwise direction as viewed in FIGURE 12.

Figure 13:
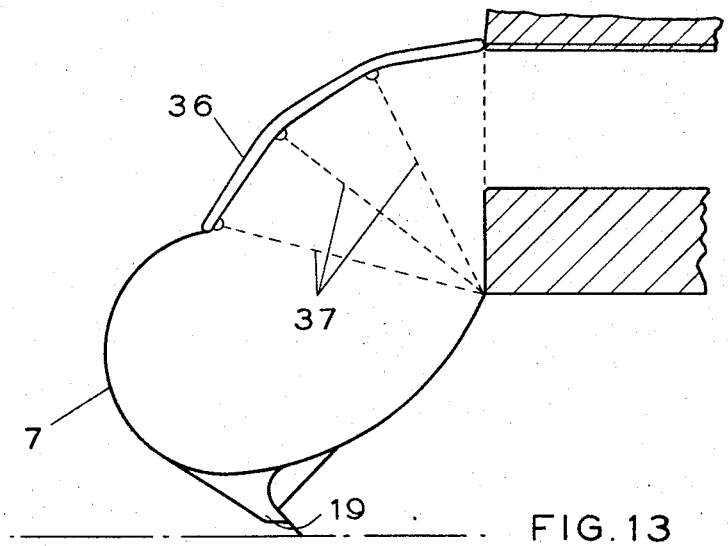

In the embodiment of FIGURE 13 the flexible skirt 7 is supported by a pressurized member 36 having ties 37 connected thereto and to the rigid base structure of the vehicle. As in the other embodiments, these ties 37 control the outward and upward movement of the pressurized member 36 and the skirt 7, thus maintaining the assembly in substantially the disposition shown in FIGURE 13.

Although we have shown and described certain specific embodiments of our invention, we are fully aware that many modifications thereof are possible and will be apparent to persons skilled in the art, and our invention, therefore, is not to be restricted to the precise details of construction shown and described, but is intended to cover all modifications coming within the scope of the appended claims.

We claim:

1. An air cushion vehicle comprising a rigid base structure and means connected to said base structure for selectively forming a supporting air cushion for said base structure of greater lateral area than the lateral area of said base structure and for selectively retracting inwardly toward said base structure so as to reduce the horizontal dimensions of said vehicle when not in operation, said means comprising a flexible inflatable skirt extending at least partially around and downwardly relative to said base structure, an flexible inflatable supporting means connected to said base structure and to said flexible inflatable skirt for selectively supporting said skirt outwardly of said base structure when inflated and for selectively collapsing inwardly when deflated, said flexible inflatable supporting means being separated from said inflatable skirt in an air-tight manner so as to be separately inflatable and maintainable at an internal pressure different from that of said skirt.

2. An air cushion vehicle according to claim 1 wherein said flexible inflatable skirt is selectively retractable at different positions around the periphery of the vehicle.

3. An air cushion vehicle according to claim 1 wherein said flexible inflatable skirt comprises a double wall skirt having and inner wall and an outer wall and a nozzle opening extending along the lower edge thereof through which pressurized air contained by said double wall skirt may issue.

4. An air cushion vehicle according to claim 3 wherein at least a portion of said flexible inflatable supporting means is comprised of a single hollow flexible structure of approximately conical cross-section, the base of said flexible structure being attached to said rigid base structure and the apex of said flexible structure being disposed laterally from said base structure.

5. An air cushion vehicle according to claim 3 wherein said flexible inflatable supporting means comprises, at least in part, an inner inflatable member connected to said rigid base structure, an outer inflatable member disposed laterally outwardly of said inner inflatable member, and radial inflatable members connected to and extending between said inner and outer inflatable members whereby said flexible inflatable skirt may be supported so as to extend at least partially around and downwardly relative to said rigid base structure.

6. An air cushion vehicle according to claim 5 wherein said inner wall is connected to said inner inflatable member and said outer wall is connected to said outer inflatable member.

7. An air cushion vehicle according to claim 6 further comprising cable means for raising and lowering said flexible inflatable skirt relative to said rigid base structure, said cable means interconnecting said outer wall of said skirt with said base structure.

8. An air cushion vehicle according to claim 6 further comprising means for supplying pressurized air to the cushion area boundaried by said skirt, said pressurized air being passed from said rigid base structure between said inner and outer inflatable supporting members and downwardly between said inner and outer walls to discharge through said nozzle opening.

9. An air cushion vehicle according to claim 3 wherein said flexible inflatable supporting means is comprised of at least a single hollow flexible structure of approximately conical cross-section, the base of said structure being attached to said rigid base structure and the apex being disposed laterally therefrom, and at least one inflatable structure of the type comprising an inner inflatable member connected to said rigid structure, an outer inflatable member disposed laterally outwardly of said inner inflatable member, and radial inflatable members interconnecting said inner and outer inflatable members, and wherein said supporting means is inflated by a source of pressurized gaseous fluid independent from that used to provide said supporting air cushion.

10. An air cushion vehicle according to claim 3 wherein said inner wall is connected to said rigid base structure and said outer wall is connected to said flexible inflatable supporting means.

11. An air cushion vehicle according to claim 10 wherein and flexible inflatable supporting means comprises a pressurized beam, one end of said beam being connected to said rigid base structure and the other end thereof being connected to said outer wall of said skirt.

12. An air cushion vehicle comprising a rigid base structure and means for selectively forming a supporting air cushion for said base structure of greater lateral area than the lateral area of said base structure and for selectively retracting inwardly toward said base structure so as to reduce the horizontal dimensions of the vehicle when not in operation, said means comprising a flexible skirt extending at least partially around and downwardly relative to said base structure, said flexible skirt comprising a double wall skirt having an inner wall and an outer wall and a nozzle opening extending along the lower edge thereof, flexible inflatable means connected to said rigid base structure and to said flexible skirt for selectively supporting said skirt outwardly of said rigid base structure when inflated and selectively collapsing inwardly when deflated, said flexible inflatable means comprising at least in part an inner inflatable member connected to said base structure, an outer inflatable member disposed laterally outwardly of said inner inflatable member and connected to said outer wall of the skirt, and radial inflatable members connected to and extending between said inner and outer inflatable members, and means for supplying pressurized air to the cushion area boundaried by said skirt, said pressurized air being passed from said rigid base structure between said inner and outer inflatable supporting members and downwardly between said inner and outer walls to discharge through said nozzle opening.

References Cited

UNITED STATES PATENTS

| | | | |
|---|---|---|---|
| 3,170,530 | 2/1965 | Black | 180—7 |
| 3,177,960 | 4/1965 | Cockerell | 180—7 |
| 3,182,739 | 5/1965 | Cockerell | 180—7 |
| 3,288,235 | 11/1966 | Jones | 180—7 |

FOREIGN PATENTS 245,422  6/1963  Australia.

A. HARRY LEVY, *Primary Examiner.*